US010630755B2

(12) United States Patent
Agrawal et al.

(10) Patent No.: US 10,630,755 B2
(45) Date of Patent: Apr. 21, 2020

(54) SELECTIVE CONSUMPTION OF WEB PAGE DATA OVER A DATA-LIMITED CONNECTION

(71) Applicant: MICROSOFT TECHNOLOGY LICENSING, LLC, Redmond, WA (US)

(72) Inventors: Deepak Agrawal, Hyderabad (IN); Rahul Razdan, Hyderabad (IN); Bibhu Choudhary, Hyderabad (IN); Nithin Ismail, Ernakulam (IN); Saurabh Satnalika, Kolkata (IN); Nithin Raj M, Hyderabad (IN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 394 days.

(21) Appl. No.: 15/491,677

(22) Filed: Apr. 19, 2017

(65) Prior Publication Data
US 2018/0309817 A1 Oct. 25, 2018

(51) Int. Cl.
*G06F 3/048* (2013.01)
*H04L 29/08* (2006.01)
(Continued)

(52) U.S. Cl.
CPC ............ *H04L 67/04* (2013.01); *G06F 16/957* (2019.01); *H04L 67/02* (2013.01); *H04L 67/2828* (2013.01); *H04L 43/16* (2013.01)

(58) Field of Classification Search
CPC ..... H04L 67/04; H04L 67/02; H04L 67/2828; G06F 16/957; G06F 16/54
(Continued)

(56) References Cited

U.S. PATENT DOCUMENTS 6,563,517 B1 * 5/2003 Bhagwat ............ H04N 21/6377
715/735
7,260,614 B2 * 8/2007 Deshpande ....... H04L 29/06027
345/641
(Continued)

OTHER PUBLICATIONS

"Display high resolution images quickly and efficiently", http://web.archive.org/web/20130507082850/http:/www.dart.com/zoom-web-image-high-performance.aspx, Published on: May 7, 2013, 1 pages.
(Continued)

*Primary Examiner* — David Phantana-angkool
(74) *Attorney, Agent, or Firm* — Shook, Hardy and Bacon, L.L.P.

(57) ABSTRACT

A problem with Internet access in a number of markets is the issue of data-limited network connections. Selective, on-demand consumption of web page data is provided. A user's browser presents a "light" version of a web page by loading compressed or low-fidelity versions of the web page images in place of the actual, higher-fidelity images. In the event that the user wishes to see the original higher-fidelity version of an image, clicking on the image or an associated icon loads the original-fidelity version of the image, replacing the low-fidelity version. The light version of the web page loads faster than would the original version of the web page, and requires less data to be downloaded when rendering the web page. This enables a user with a data-limited connection to select how he or she wishes to "spend" their data consumption.

20 Claims, 7 Drawing Sheets

(51) Int. Cl.
*G06F 16/957* (2019.01)
*H04L 12/26* (2006.01)

(58) Field of Classification Search
USPC .......................................................... 715/739
See application file for complete search history.

(56) References Cited

U.S. PATENT DOCUMENTS

| | | | |
|---|---|---|---|
| 7,703,013 B1* | 4/2010 | Bauermeister | G06F 16/954 715/255 |
| 8,014,608 B2 | 9/2011 | Adams et al. | |
| 9,247,028 B1* | 1/2016 | Dayan | G06F 16/9577 |
| 9,787,799 B2* | 10/2017 | Grue | G06F 16/5866 |
| 9,798,497 B1* | 10/2017 | Schick | G06F 3/0664 |
| 10,296,552 B1* | 5/2019 | Malin | G06F 17/2247 |
| 2006/0092266 A1 | 5/2006 | Morgan | |
| 2007/0226169 A1 | 9/2007 | Solyanik et al. | |
| 2009/0089448 A1 | 4/2009 | Sze et al. | |
| 2011/0137973 A1* | 6/2011 | Wei | H04L 67/1008 709/202 |
| 2015/0143224 A1* | 5/2015 | Kennedy | G06F 17/2247 715/234 |
| 2018/0279199 A1* | 9/2018 | Karakkad Kesavan Namboodiri | H04W 76/10 |
| 2018/0309817 A1* | 10/2018 | Agrawal | H04L 67/04 |
| 2019/0158371 A1* | 5/2019 | Dillon | H04L 43/087 |

OTHER PUBLICATIONS

"Responsive Images", http://web.archive.org/web/20160618114602/https:/developers.google.com/speed/pagespeed/module/filter-image-responsive, Published on: Jun. 18, 2016, 2 pages.

Hoffman, Chris, "How to Reduce Data Usage When Browsing the Web on a Smartphone", http://www.howtogeek.com/181567/how-to-reduce-data-usage-when-browsing-the-web-on-a-smartphone/, Published on: Mar. 2, 2014, 4 pages.

"LQIP Your Images for Fast Loading", https://blog.imgix.com/2016/06/01/lqip-your-images.html, Published on: Jun. 1, 2016, 4 pages.

Givati, Yoav, "New feature: Responsive images", https://webflow.com/blog/new-feature-responsive-images, Published on: Sep. 14, 2016, 18 pages.

* cited by examiner

SELECTIVE CONSUMPTION OF WEB PAGE DATA OVER A DATA-LIMITED CONNECTION

BACKGROUND OF THE INVENTION

A problem with Internet access in a number of markets is the issue of data-limited network connections. This is often true in emerging markets and developing countries, as well as in established markets in which users elect to subscribe to a data-limited Internet access plan. Limitations on data may occur in different forms. For example, a low-bandwidth network, such as a dial-up connection, may provide a slow connection over which download times are excessively long for large items of content. Even typically faster access networks, such as wifi, may provide a slow connection if the wifi network is shared by multiple users or devices. Alternatively, a data-limited plan may provide a fast connection, but may be limited in the total amount of data that is provided to the user within a given period of time, such as per month. In some situations, there may be a fixed limit to how much data a user can consume, say, per month. In other situations, once the user consumes a given amount of data, the user may incur additional costs, often prohibitive, associated with a data overage. In other situations, a user may not incur additional costs for overages, but the data rate may be drastically slowed by the provider once an allotted amount of high-speed data has been exceeded.

When a user with a slow data connection accesses a web page that displays a large number of images, and/or high-resolution images, the web page may load so slowly that the user loses patience and navigates to other pages. This may result in not only frustration for the user, but also a potential loss of revenue or page popularity for the entity associated with the web page. On the other hand, when a user with a capped data plan accesses a web page that displays a large number of images, and/or high-resolution images, the web page may rapidly deplete the user's data allotment.

BRIEF SUMMARY OF THE INVENTION

The present invention generally relates to providing a user with selective, on-demand data consumption when accessing web pages. For example, the user's browser may presents a "light" version of a web page by loading compressed or low-resolution versions of the web page images in place of the actual, higher-resolution images. In an embodiment, in the event that the user wishes to see the original higher-resolution version of an image, then simply clicking on the image, or on an associated icon or link, loads the original image, replacing the low-resolution version. In this way, the web page loads faster than would the original version of the web page, and also requires less data to be downloaded in rendering the web page, which gives the user the ability to select how he or she wishes to "spend" their data consumption.

In a first aspect, a method provides selective consumption of web page data over a data-limited connection. In response to a request from a user to display a web page via a network connection, a determination is made as to whether the user's network connection is data-limited. In response to a determination that the user's network connection is data-limited, the web page is provided such that the original-fidelity images on the web page are replaced with low-fidelity versions of the images. Providing the web page with the low-fidelity versions of the images requires less data to be sent over the user's network connection than providing the web page with the original-fidelity images. Included on the web page, for each low-fidelity version of an image, is a respective user-selectable option to display the original-fidelity image.

In a second aspect, computer-readable media embodying computer-executable instructions are provided for performing a method of providing selective consumption of web page data over a data-limited connection. The method includes, in response to a request from a user to display a web page via a network connection, a determination of whether the user's network connection is data-limited. In response to a determination that the user's network connection is data-limited, the web page is provided such that one or more original-fidelity content items on the web page are replaced with low-fidelity versions of the content items. Providing the web page with the low-fidelity versions of the content items requires less data to be sent over the user's network connection than providing the web page with the original-fidelity content items. Included on the web page, for each low-fidelity version of a content item, is a respective user-selectable option to display the original-fidelity content item. A determination is made that the user selected an option to display an original-fidelity content item in place of a low-fidelity version of a first content item. In response to the selected option, the original-fidelity version of the first content item is retrieved and is provided to replace the low-fidelity version of the first content item in the web page.

In a third aspect, a system provides selective consumption of web page data over a data-limited connection. The system includes a web browser, executing on a user device, that receives a user request to display a web page and determines whether the user is utilizing a data-limited connection. When the user is not utilizing a data-limited connection, the web browser retrieves the web page from a server that hosts the web page, such that the retrieved web page includes original-fidelity images. When the user is utilizing a data-limited connection, then the web browser sends the user request to a data management server and receives a light version of the web page from the data management server. The light version of the web page includes low-fidelity versions of the original-fidelity images, and includes, for each low-fidelity version of an image, a respective user-selectable option to display a corresponding original-fidelity image. The web page also displays the light version of the web page.

The system also includes the data management server that receives the user request from the web browser to display a web page, comprising original-fidelity images, that is hosted on a web server. The data management server determines whether low-fidelity versions of the original-fidelity images have previously been saved in a cache. When low-fidelity versions of the images have not previously been cached, then the data management server generates the low-fidelity versions of the images and saves the low-fidelity versions in the cache. When the low-fidelity versions of the images have previously been cached, then the data management server obtains the low-fidelity versions of the images from the cache. The data management server includes in the web page the low-fidelity versions of the original-fidelity images and, for each low-fidelity version of an image, the respective user-selectable option to display the corresponding original-fidelity image, and provides the web page to the web browser.

Additional objects, advantages, and novel features of the invention will be set forth in part in the description which follows, and in part will become apparent to those skilled in the art upon, and as a result of, examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Internet users may access web pages on the Internet by way of a number of types of networks. Examples of networks include Wireless Local Access Networks such as Wi-Fi, Wide-Area Local Access Networks such as WiMAX, cellular networks, satellite networks, and land-line telephone networks, among others. The various types of networks may have dissimilar operating characteristics that impact delivery and/or cost of content to a user. For example, bandwidth and data rate may vary from one type of network to another, or from one network provider to another. Additionally, networks may be associated with different types of access fees, subscriptions, usage costs, and other characteristics associated with entities such as access providers, service providers, and carriers, among others. The issue of limited data availability, whether due to low bandwidth, low data rate, overage costs, and so forth, affects a sizeable number of Internet users. Some embodiments of the present invention provide a user with the ability to selectively consume data when accessing a website, i.e., the user may be presented with a version of a web page containing low-resolution versions of the web page's images, with an option to selectively load the high-resolution (or original-resolution) versions of individual images.

Figure 1:
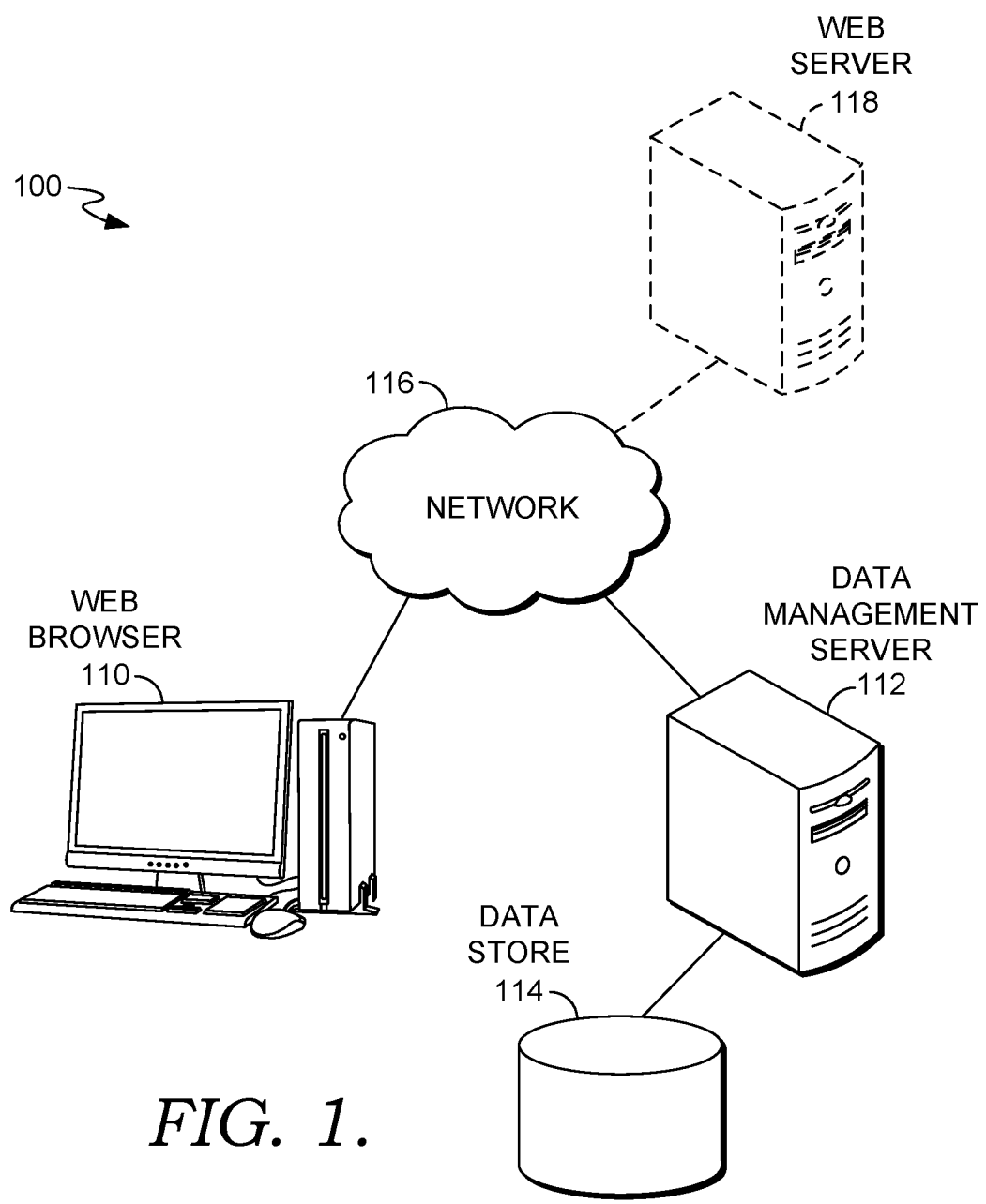
FIG. 1 is a block diagram of an exemplary system suitable for use in implementing aspects of the technology described herein.

Turning now to FIG. 1, a block diagram is provided illustrating an exemplary system 100 in which some embodiments of the present invention may be employed, and is designated generally as system 100. System 100 is but one example of a suitable system and is not intended to suggest any limitation as to the scope of use or functionality of aspects of the technology described herein. Neither should system 100 be interpreted as having any dependency or requirement relating to any one or combination of components illustrated.

Among other components not shown, system 100 includes a web browser 110 executing on a user device, a data management server 112, a data cache 114, and a network 116. System 100 may interact with a web server 118, although web server 118 is not necessarily included as a component of system 100. In an embodiment, system 100 does not include web browser 110 or network 116, but interacts with, or by way of, web browser 110 and network 116.

Figure 2:
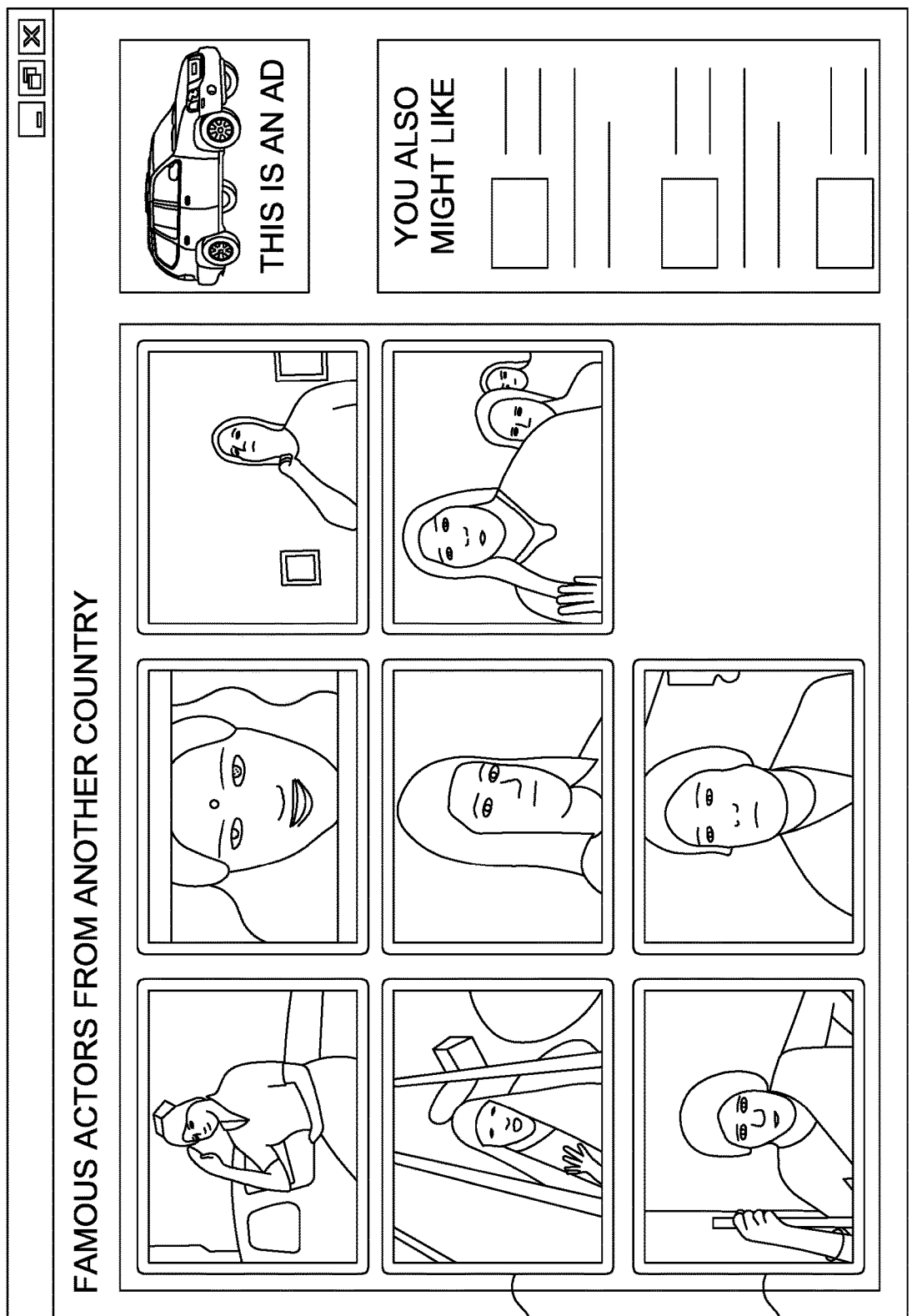
FIGS. 2-4 are depictions of versions of an exemplary web page suitable for use in implementing aspects of the technology described herein.
Figure 3:
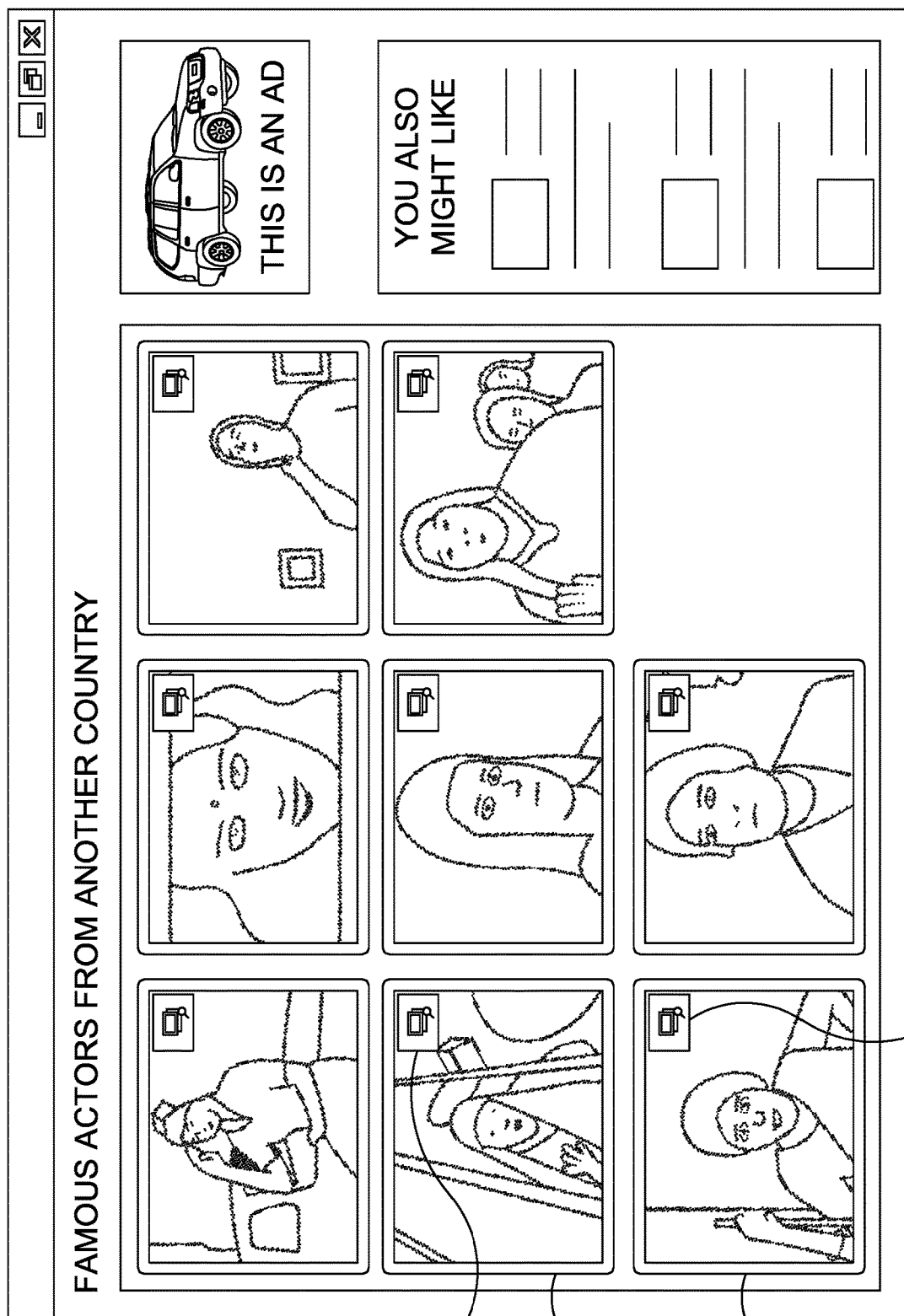
Figure 4:
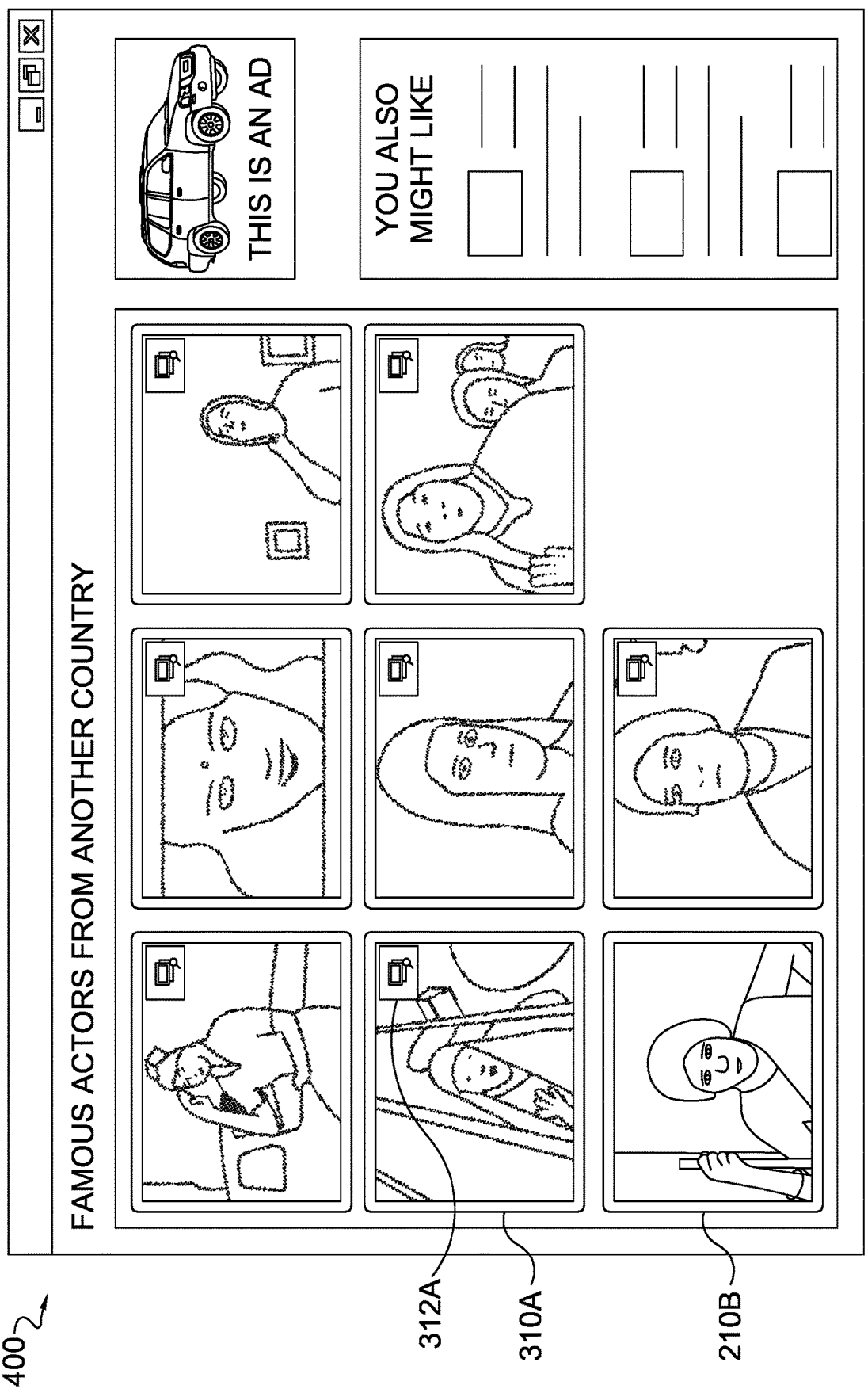

FIG. 1 will be discussed with reference to FIGS. 2, 3, and 4. FIGS. 2, 3, and 4 depict versions of an exemplary web page suitable for use with the system of FIG. 1, and are designated generally as web pages 200, 300, and 400, respectively. Web pages 200, 300, and 400 are but examples of suitable web pages and are not intended to suggest any limitation as to the scope of use or functionality of the technology described herein. Neither should web pages 200, 300, and 400 be interpreted as having any dependency or requirement relating to any one or combination of components illustrated Web browser 110 receives user requests to view a web page, e.g., by way of a web address entered or selected by a user, and displays the requested web page to the user. A web address may be entered by the user as a typed-in Uniform Resource Locator (URL), as a URL associated with a selected bookmark or hyperlink, and so forth. For example, the user may enter a URL associated with a web page hosted by web server 118, such as web page 200 depicted in FIG. 2. Web server 118 may be a third-party web server, having no association with the provider of data management server 112 or web browser 110. The delivery of a web page over a data-limited connection as provided by system 100 does not require web server 118 to include any special software or functionality beyond the typical web server functions associated with serving web pages. Web page 200 may include one or more images such as image 210A and image 210B, where each image has a level of image fidelity associated with it, referred to herein as an original fidelity. The term "fidelity" as used herein refers to the degree of resolution or detail that is possessed by an image, and/or a corresponding data size of the image. For example, a low-fidelity version of an original image may be visually degraded in comparison to the original image, and also has a smaller data size than the original image. The term "original fidelity" as used herein does not necessarily refer to the level of fidelity possessed by an image or other content item at the time of its creation (e.g., the fidelity of an original digital photograph or original scanned image), but rather refers to the fidelity of an image or item as it would originally have been presented on the requested web page prior to generation of a low-fidelity, low-data-size version of the image. The term "low fidelity" as used herein refers to a level of fidelity that is lower than the original fidelity of an image or other content item, and does not necessarily imply a predefined, fixed level of fidelity. In an embodiment, the term "medium fidelity" refers to a fidelity level that is between "low fidelity" and "original fidelity."

In response to a user request to view web page 200, web browser 110 determines whether the user is utilizing a data-limited connection. A data-limited connection may include a connection having a low bandwidth, a slow data rate, a provider-imposed data cap, and so forth. When web browser 110 determines that the user is not utilizing a data-limited connection, then web browser 110 retrieves web page 200 from web server 118. Web page 200 as depicted in FIG. 2, and as retrieved from web server 118, includes the original-fidelity images as provided from web server 118.

When web browser 110 determines that the user is utilizing a data-limited connection, then rather than sending the request to web server 118, web browser 110 sends the user request to data management server 112, which serves as a substitute, or an intermediary or proxy, between web browser 110 and web server 118. Data management server 112 receives the user request to display web page 200 hosted on web server 118, and determines whether low-fidelity versions of the original-fidelity images associated with web page 200 have previously been saved in a cache in data store 114. When low-fidelity versions of the images have not previously been cached, then data management server 112 retrieves the original-fidelity images and generates the low-fidelity versions of the images and saves the low-fidelity versions in the cache. In an embodiment, data management server 112 retrieves the original-fidelity images from web server 112. When the low-fidelity versions of the images have previously been cached in data store 114, then data management server 112 obtains the low-fidelity versions of the images from the cache. Data management server 112 also obtains web page 200 from web server 118, and provides the web page to web browser 110, but with the low-fidelity versions of the images provided in place of the original-fidelity images, as depicted in FIG. 3. FIG. 3 depicts a web page 300 which is a "light" version of web page 200, in that the original-fidelity images have been replaced with the low-fidelity versions of the images, such as images 310A and 310B.

Data management server 112 also includes in web page 300, for each low-fidelity version of an image, a respective user-selectable option 312 to display the corresponding original-fidelity image in place of the low-fidelity version of the image, examples of which are denoted in FIG. 3 as options 312A and 312B. Web page 300 thus has a smaller overall data size than web page 200, because the low-fidelity images have smaller data sizes than the original-fidelity images of web page 200. Thus, web page 300 as provided by data management server 112 requires less data to be communicated to the web browser than if the original-fidelity images were included.

In an embodiment, prior to providing the web page, data management server 112 determines whether one or more images on the web page are associated with one or more interests of the user. When a determination is made that one or more images on the web page are associated with one or more interests of the user, then data management server 112 automatically includes on the web page, for one or more of the images associated with the one or more interests of the user, the original-fidelity image rather than a low-fidelity version of the image.

Web browser 110 receives the light version of the web page from data management server 112, which includes the low-fidelity versions of the original-fidelity images and the respective user-selectable options to display the corresponding original-fidelity images, and renders the page for display to the user. When web browser 110 determines that the user has selected an option to display one of the original-fidelity images in place of the low-fidelity version of the image, such as option 312B associated with low-fidelity image 310B, web browser 110 retrieves the original-fidelity image 210B and presents it in place of the low-fidelity version of image 310B in web page 300. In an embodiment, web browser 110 retrieves the original-fidelity image 210B from web server 118. In another embodiment, web browser 110 retrieves the original-fidelity image 210B from data management server 112, which may cache original-fidelity images as well as low-fidelity images. FIG. 4 depicts a web page 400, which is a version of the web page after the user has selected option 310B and the low-fidelity image 310B has been replaced with the original-fidelity image 210B.

Figure 5:
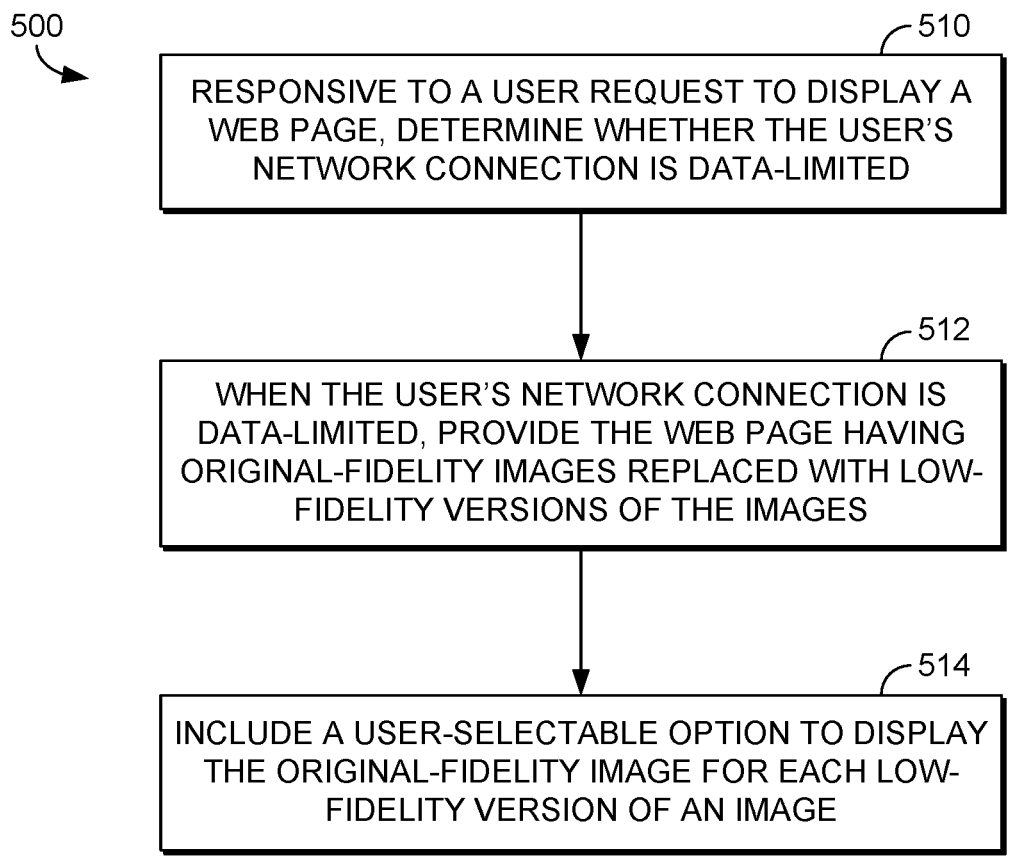
FIGS. 5 and 6 are flowcharts of exemplary methods suitable for use in implementing aspects of the technology described herein.

Turning now to FIG. 5, a flow diagram is provided illustrating one exemplary method for enabling selective data consumption of web page data, and is designated generally as method 500. Method 500 is but one example of a suitable method and is not intended to suggest any limitation as to the scope of use or functionality of the technology described herein. Neither should method 500 be interpreted as having any dependency or requirement relating to any one or combination of components illustrated.

In an embodiment, method 500 is performed by a user's web browser either by way of a browser plug-in or an inherent functionality. However, method 500 is not required to be performed by a web browser. For example, method 500 may be performed by an operating system or other application on the user's device, or may be performed remotely at a server or other network device.

At step 510, in response to a request from a user to display a web page via a network connection, a determination is made as to whether the user's network connection is data-limited. A user may connect to the Internet over a variety of networks or access networks, such as wifi, wimax, cellular, cable, satellite and dial-up (i.e., a telephone network landline), among others. In an embodiment, determining that the user's network connection is data-limited comprises determining that the user's network connection speed is below a threshold or determining that the user's network connection is metered (e.g., fees are assessed based on the amount of data usage). Determining that the user's network connection is metered may comprise determining that the user's connection is provided within a market that utilizes metered data plans. In one embodiment, determining that the user's network connection is metered comprises determining that the user subscribes to a data plan that restricts the user's data usage by capping the data, charging fees for data overages, reduces data speed when an overage occurs, and so forth. In another embodiment, determining that the user's network connection is data-limited comprises determining that the user's connection utilizes a type of network that is known to be data-limited, such as a dial-up telephone network, among others.

The determination that a user's network connection is data-limited may be accomplished in any of a number of ways. For example, an operating system, such as Microsoft Windows®, may include Application Programming Interface (API) functions which can be utilized to determine connection speed and/or connection type (e.g., dial-up, cellular, wifi, and so forth). As another example, a user profile may be maintained that includes information about the user's network subscription, home access network type, and other factors that pertain to the user's connection speed, data plan, network subscription, and so forth. In an embodiment, the user may provide an indication of whether the network connection is data-limited. The user-provided indication may take the form of a user setting or user preference associated with a browser, an application, an operating system, and/or a user profile. The user-provided indication may also take the form of a user response to a prompt, where the prompt may be presented on the user device and may originate from the user device or a network device.

At step 512, in response to determining that the user's network connection is data-limited, the web page is provided to the user, i.e., displayed on the user's device, such that the original-fidelity images on the web page have been replaced with low-fidelity versions of the images. Providing the web page with the low-fidelity versions of the images requires less data to be sent over the user's network connection than providing the web page with the original-fidelity images. In an embodiment, providing the web page with the low-fidelity versions of the images includes a determination as to whether the low-fidelity versions of the images have previously been saved in a cache. When the low-fidelity versions of the images have previously been cached, then the low-fidelity versions of the images are obtained from the cache. When the low-fidelity versions of the images have not previously been cached, then the original-fidelity versions of the images are retrieved from their locations on the web, and the low-fidelity versions of the images are generated and saved in the cache.

Generating the low-fidelity versions of the images may comprise compressing the images. As one example, an original high-resolution uncompressed image may be converted to a lossy or reduced-resolution JPG-format image. Other types of compression may also be utilized. In an embodiment, generating the low-fidelity versions of the images comprises resampling the images such that the images have a lower resolution. In one embodiment, the low-fidelity versions of the images retain the screen dimensions of the respective original-fidelity images when the web page is rendered. In an embodiment, rendering the web page with the low-fidelity versions of the images does not change the original layout of the web page. A low-fidelity version is generated individually for each image, rather than simply generating a compressed or low-fidelity version of the web page as a whole.

Some users may not utilize a data-limited network connection. In an embodiment, when the user's network connection is not data-limited, then the web page is provided to the user with the original-fidelity images instead of the low-fidelity versions of the images.

At step 514, for each low-fidelity version of an image on the web page, a respective user-selectable option to display the original-fidelity image is included on the web page. In one embodiment, for each user-selectable option to display an original-fidelity version of an image, a visual indication is presented that identifies the option. The visual indication may take the form of an icon, a button, a label, or other graphical indication located on, adjacent to, or near the corresponding low-fidelity version of an image. The user-selectable option may be selected by clicking on, or otherwise selecting, the visual indication. In another embodiment, there is no specific visual indication of the user-selectable option, and the user-selectable option is selected by clicking on, or otherwise selecting, the image for which the original-fidelity version is desired.

In an embodiment, a determination is made that the user selected an option to display an original-fidelity image in place of a low-fidelity version of a first image. In response to the selected option, the original-fidelity version of the first image is retrieved, and is provided to replace the low-fidelity version of the first image in the web page. The other low-fidelity images remain unchanged, i.e., the low-fidelity versions of other images are not replaced with the original-fidelity versions in response to the selected option for the first image. In one embodiment, the provided web page includes a user-selectable option to display the entire web page utilizing the original-fidelity images instead of the low-fidelity versions of the images. In the event that the user selects that option, the original-fidelity versions of all of the low-fidelity images on the web page are retrieved, and are provided to replace the low-fidelity versions of the images on the web page.

Figure 6:
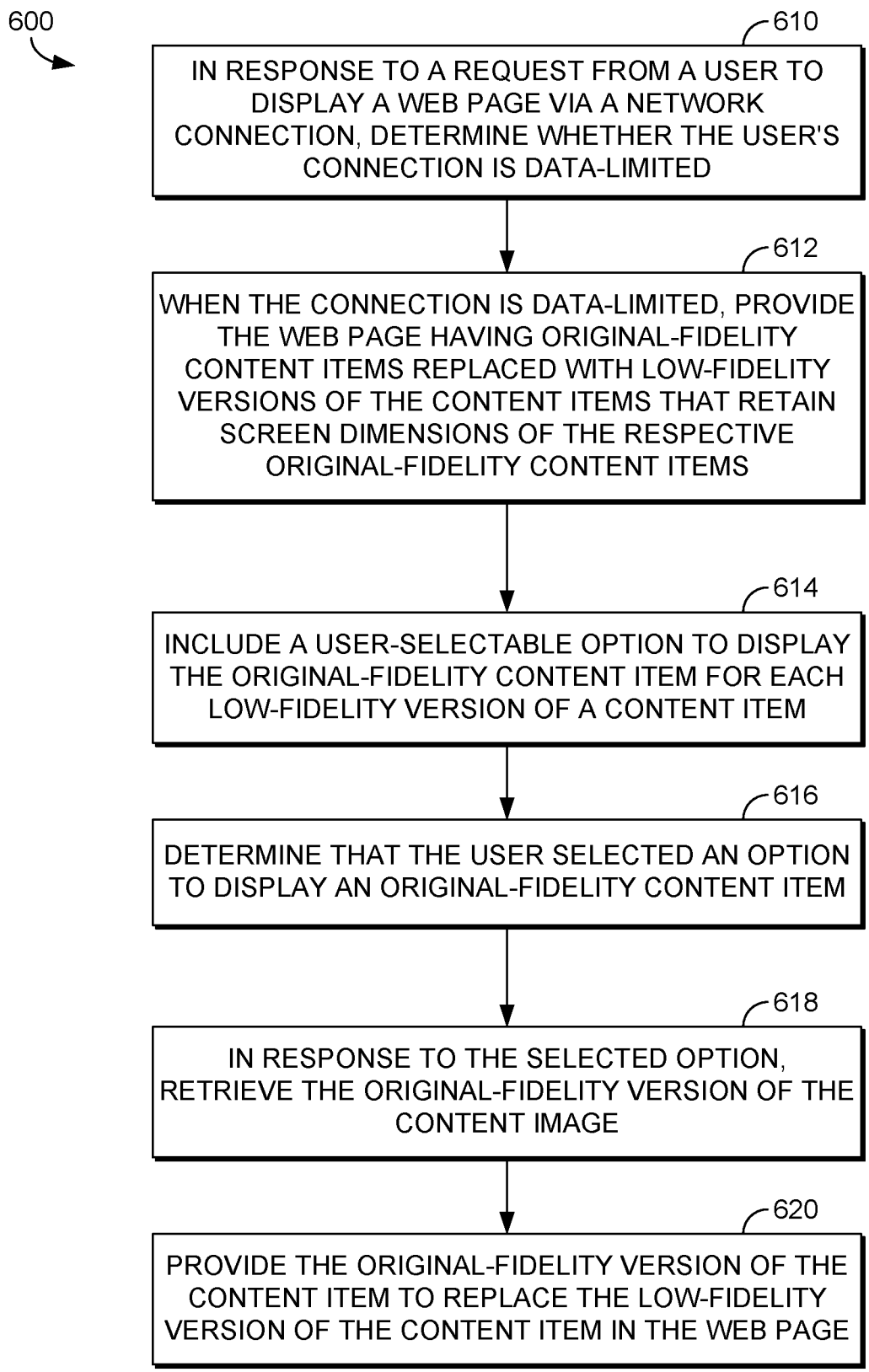

Turning now to FIG. 6, a flow diagram is provided illustrating another exemplary method for enabling selective data consumption of web page data, and is designated generally as method 600. Method 600 is but one example of a suitable method and is not intended to suggest any limitation as to the scope of use or functionality of the technology described herein. Neither should method 600 be interpreted as having any dependency or requirement relating to any one or combination of components illustrated.

In an embodiment, method 600 is performed by a user's web browser either by way of a browser plug-in or an inherent functionality. However, method 600 is not required to be performed by a web browser. For example, method 600 may be performed by an operating system or other application on the user's device, or may be performed remotely at a server or other network device.

At step 610, in response to a request from a user to display a web page via a network connection, a determination is made as to whether the user's network connection is data-limited. As described above, a data-limited connection may include a connection having a low bandwidth, a slow data rate, a provider-imposed data cap, and so forth. The requested web page may include one or more content items for display. The content items may include items such as photographs, static images, animated images (such as animated GIFs, for example), videos, and audio files, among others.

At step 612, in response to determining that the user's network connection is data-limited, the web page is provided to the user, i.e., displayed on the user's device, such that the original-fidelity content items on the web page have been replaced with low-fidelity versions of the content items that retain the screen dimensions of the respective original-fidelity content items, such that the low-fidelity versions of the content items are presented at the same dimensional size on the user's device as the original-fidelity content items would have been. This differs from simply displaying a thumbnail version of a content item. A thumbnail is dimensionally smaller, typically significantly so, than an original content item. Replacing a content item with a thumbnail results in large areas of blank space around the thumbnail, and/or results in a rearrangement of the page layout. By retaining the dimensions of the original-fidelity content items for the low-fidelity versions of the content items, the look and feel of the web page is maintained when the web page is rendered with the low-fidelity versions of the original-fidelity content items.

Additionally, although the visual appearance of the low-fidelity content items may be degraded with respect to the original-fidelity content items, the low-fidelity content items are configured to provide the user with enough visual detail that the user can decide whether or not to request the original-fidelity version of a content item. This, too, is different than simply displaying a content item thumbnail, in which a very large amount of detail is lost, often to a degree that the user cannot discern what is depicted in the thumbnail. Thus, providing the web page with the low-fidelity versions of the content items maintains the overall appearance of the web page, while requiring less data to be sent over the user's network connection than if the original-fidelity content items were provided on the web page. In an embodiment, the web page with the low-fidelity versions of the content items maintains the original layout of the web page.

In one embodiment, a determination is automatically made to provide original-fidelity versions of some content items and low-fidelity version of other content items. Prior to providing the web page, one or more interests of the user are determined. The one or more interests of the user may be determined from a user profile, user-specified interests, online purchase history, and so forth. One or more content items on the web page are identified that are associated with the one or more interests of the user. For one or more of the content items associated with the one or more interests of the user, the original-fidelity content item, rather than the low-fidelity version of the content item, is included on the web page. In this way, the user is automatically provided with the original-fidelity versions of the content items that the user would likely want to view at their original fidelities. In an embodiment, the high-fidelity content items to be included on the web page are determined at least in part based on the user's past or current web browsing patterns.

Some users may not utilize a data-limited network connection. In an embodiment, when the user's network connection is not data-limited, then the web page is provided to the user with the original-fidelity content items instead of the low-fidelity versions of the content items.

At step 614, for each low-fidelity version of a content item on the web page, a respective user-selectable option to display the original-fidelity content item is included on the web page. The user-selectable option may be denoted by a visual indication in the form of an icon, a button, a label, or other graphical element. In one embodiment, there is no specific visual indication of the user-selectable option, and the user-selectable option is selected by clicking on, or otherwise selecting, the content item for which the original-fidelity version is desired. In an embodiment, the user-selectable option associated with a low-fidelity image is an option to display a medium-fidelity version of the image, rather than the original-fidelity image. In one embodiment, when the medium-fidelity version of an image is displayed, then the user-selectable option associated with the medium-fidelity image is an option to display the original-fidelity image.

At step 616, a determination is made that the user selected an option to display an original-fidelity content item in place of a low-fidelity version of a first content item.

At step 618, in response to the selected option, the original-fidelity version of the first content item is retrieved. The original-fidelity version of the first content item may be retrieved either locally or remotely from a cache if it is present in the cache. Otherwise, it may be obtained from its location on the web, e.g., from the web server that hosts the original web page.

At step 620, the original-fidelity version of the first content item is provided to replace the low-fidelity version of the first content item in the web page, without providing the entire web page again. In an embodiment, the other low-fidelity content items remain unchanged, i.e., the low-fidelity versions of other content items are not replaced with the original-fidelity versions in response to the selected option for the first content item.

Figure 7:
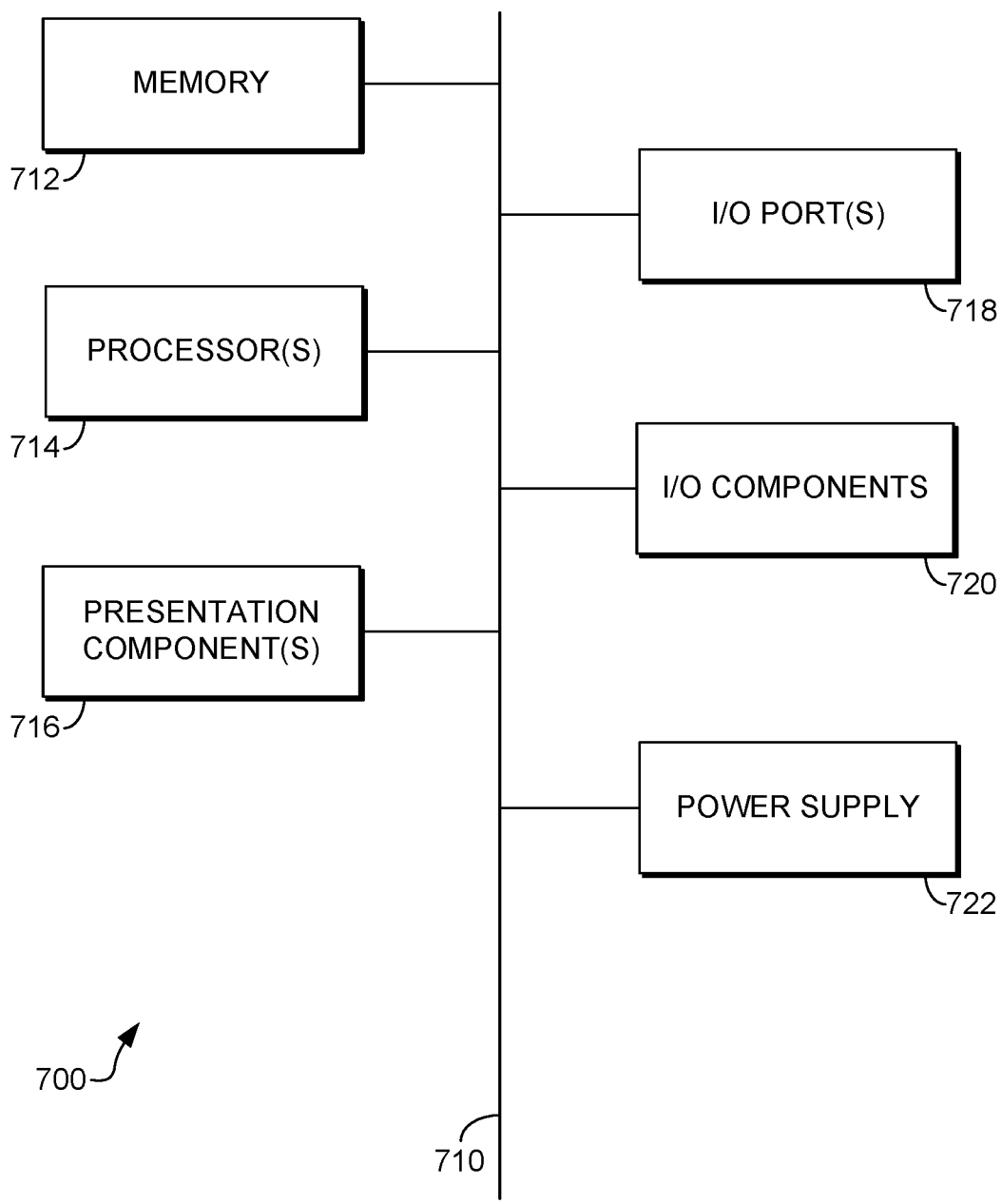
FIG. 7 is a block diagram of an exemplary computing environment suitable for use in implementing aspects of the technology described herein.

Having described some aspects of the technology presented herein, an exemplary operating environment in which aspects of the technology presented herein may be implemented is described below in order to provide a general context for various aspects of the technology presented herein. Referring to FIG. 7 in particular, an exemplary operating environment for implementing aspects of the technology presented herein is shown and designated generally as computing device 700. Computing device 700 is but one example of a suitable computing environment and is not intended to suggest any limitation as to the scope of use or functionality of aspects of the technology described herein. Neither should the computing device 700 be interpreted as having any dependency or requirement relating to any one or combination of components illustrated.

Aspects of the technology provided herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Aspects of the technology described herein may be practiced in a variety of system configurations, including hand-held devices, consumer electronics, general-purpose computers, more specialty computing devices, etc. Aspects of the technology described herein may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

The technology has been described in relation to particular aspects, which are intended in all respects to be illustrative rather than restrictive. Upon and because of reading the description herein, alternative configurations may become apparent to those of ordinary skill in the art to which the technology described herein pertains without departing from its scope.

From the foregoing, it will be seen that the technology described herein is well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

EMBODIMENTS

Embodiment 1

A method of providing a web page over a data-limited connection, comprising: in response to a request from a user to display a web page via a network connection, determining whether the user's network connection is data-limited; in response to determining that the user's network connection is data-limited, providing the web page, wherein images on the web page having an original fidelity are replaced with low-fidelity versions of the images, and wherein providing the web page with the low-fidelity versions of the images requires less data to be sent over the user's network connection than providing the web page with the original-fidelity images; and including on the web page, for each low-fidelity version of an image, a respective user-selectable option to display the original-fidelity image.

Embodiment 2

The method of embodiment 1, comprising: in response to determining that the user's network connection is not data-limited, then providing the web page with the original-fidelity images.

Embodiment 3

The method of embodiment 1, comprising: when the user's network connection is data-limited, then determining whether the low-fidelity versions of the images have previously been saved in a cache.

Embodiment 4

The method of embodiment 3, comprising: when the low-fidelity versions of the images have previously been saved in the cache, then obtaining the low-fidelity versions of the images from the cache.

Embodiment 5

The method of embodiment 3, comprising: when the low-fidelity versions of the images have not previously been saved in the cache, then generating the low-fidelity versions of the images and saving the low-fidelity versions in the cache.

Embodiment 6

The method of any of embodiments 1, 3, or 4, wherein the web page with the low-fidelity versions of the images maintains an original layout of the web page.

Embodiment 7

The method of any of embodiments 1, 3, or 4, wherein the low-fidelity versions of the images retain screen dimensions of the respective original-fidelity images.

Embodiment 8

The method of embodiment 1, comprising: determining that the user selected an option to display an original-fidelity image in place of a low-fidelity version of a first image; in response to the selected option, retrieving the original-fidelity version of the first image; and providing the original-fidelity version of the first image to replace the low-fidelity version of the first image in the web page.

Embodiment 9

The method of embodiment 8, wherein the low-fidelity versions of other images are not replaced with original-fidelity versions in response to the selected option for the first image.

Embodiment 10

The method of embodiment 1, wherein the provided web page includes a user-selectable option to display the entire web page utilizing the original-fidelity images instead of the low-fidelity versions of the images.

Embodiment 11

The method of embodiment 5, wherein generating the low-fidelity versions of the images comprises compressing the images.

Embodiment 12

The method of any of embodiments 1, 3, 4, or 8, wherein for each user-selectable option to display an original-fidelity version of an image, a visual indication is presented that identifies the option.

Embodiment 13

The method of any of embodiments 1, 3, 4, or 8, wherein determining that the user's network connection is data-limited comprises determining that the user's network connection speed is below a threshold or determining that the user's network connection is metered.

Embodiment 14

The method of embodiment 13, wherein determining that the user's network connection is metered comprises determining that the user's connection is provided within a market that utilizes metered data plans.

Embodiment 15

One or more computer storage media having embodied thereon computer-executable instructions which, when executed by one or more processors, perform a method of providing a web page over a data-limited connection, the method comprising: in response to a request from a user to display a web page via a network connection, determining whether the user's network connection is data-limited; in response to determining that the user's network connection is data-limited, providing the web page, wherein one or more content items on the web page having an original fidelity are replaced with low-fidelity versions of the content items, wherein the low-fidelity versions of the content items retain screen dimensions of the respective original-fidelity content items, and wherein providing the web page with the low-fidelity versions of the content items requires less data to be sent over the user's network connection than providing the web page with the original-fidelity content items; including on the web page, for each low-fidelity version of a content item, a respective user-selectable option to display the original-fidelity content item; determining that the user selected an option to display an original-fidelity content item in place of a low-fidelity version of a first content item; in response to the selected option, retrieving the original-fidelity version of the first content item; and providing the original-fidelity version of the first content item to replace the low-fidelity version of the first content item in the web page.

Embodiment 16

The media of embodiment 15, comprising: in response to determining that the user's network connection is not data-limited, then providing the web page with the original-fidelity content items.

Embodiment 17

The media of embodiment 15, comprising: prior to providing the web page, determining that one or more content items on the web page that are associated with one or more interests of the user; and automatically including on the web page, for one or more of the content items associated with the one or more interests of the user, the original-fidelity content item rather than a low-fidelity version of the content item.

Embodiment 18

The media of any of embodiments 15 or 17, wherein the web page with the low-fidelity versions of the content items maintains an original layout of the web page.

Embodiment 19

A system for providing a web page over a data-limited connection, comprising: a data management server that: receives, from a web browser, a user request to display a web page that is hosted on a web server, wherein the web page comprises original-fidelity images; determines whether low-fidelity versions of the original-fidelity images have previously been saved in a cache; when low-fidelity versions of the images have not previously been cached, then generates the low-fidelity versions of the images and saves the low-fidelity versions in the cache; when the low-fidelity versions of the images have previously been cached, then obtains the low-fidelity versions of the images from the cache; includes in the web page the low-fidelity versions of the original-fidelity images and, for each low-fidelity version of an image, a respective user-selectable option to display the corresponding original-fidelity image; and provides the web page to the web browser.

Embodiment 20

The system of embodiment 19, wherein the data management server further: determines, prior to providing the web page, that one or more images on the web page are associated with one or more interests of the user; and automatically includes on the web page, for one or more of the images associated with the one or more interests of the user, the original-fidelity image rather than a low-fidelity version of the image.

Having thus described the invention, what is claimed is:
1. A method of providing a web page over a data-limited connection, comprising:
in response to a request from a user to display a web page via a network connection, determining whether the user's network connection is data-limited, wherein determining that the user's network connection is data-limited comprises determining that a speed of the user's network connection is below a threshold or determining that the user's network connection is metered;
in response to determining that the user's network connection is data-limited, providing the web page, wherein images on the web page having an original fidelity are replaced with low-fidelity versions of the images, and wherein providing the web page with the low-fidelity versions of the images requires less data to be sent over the user's network connection than providing the web page with the original-fidelity images; and
including on the web page, for each low-fidelity version of an image, a respective user-selectable option to display the original-fidelity image.

2. The method of claim 1, comprising:
in response to determining that the user's network connection is not data-limited, then providing the web page with the original-fidelity images.

3. The method of claim 1, comprising:
when the user's network connection is data-limited, then determining whether the low-fidelity versions of the images have previously been saved in a cache.

4. The method of claim 3, comprising:
when the low-fidelity versions of the images have previously been saved in the cache, then obtaining the low-fidelity versions of the images from the cache.

5. The method of claim 3, comprising:
when the low-fidelity versions of the images have not previously been saved in the cache, then generating the low-fidelity versions of the images and saving the low-fidelity versions in the cache.

6. The method of claim 1, wherein the web page with the low-fidelity versions of the images maintains an original layout of the web page.

7. The method of claim 1, wherein the low-fidelity versions of the images retain screen dimensions of the respective original-fidelity images.

8. The method of claim 1, comprising:
determining that the user selected an option to display an original-fidelity image in place of a low-fidelity version of a first image;
in response to the selected option, retrieving the original-fidelity version of the first image; and
providing the original-fidelity version of the first image to replace the low-fidelity version of the first image in the web page.

9. The method of claim 8, wherein the low-fidelity versions of other images are not replaced with original-fidelity versions in response to the selected option for the first image.

10. The method of claim 1, wherein the provided web page includes a user-selectable option to display the entire web page utilizing the original-fidelity images instead of the low-fidelity versions of the images.

11. The method of claim 5, wherein generating the low-fidelity versions of the images comprises compressing the images.

12. The method of claim 1, wherein for each user-selectable option to display an original-fidelity version of an image, a visual indication is presented that identifies the option.

13. The method of claim 1, wherein determining that the user's network connection is metered comprises determining that the user's connection is provided within a market that utilizes metered data plans.

14. One or more computer storage media having embodied thereon computer-executable instructions which, when executed by one or more processors, perform a method of providing a web page over a data-limited connection, the method comprising:
in response to a request from a user to display a web page via a network connection, determining whether the user's network connection is data-limited wherein determining that the user's network connection is data-limited comprises determining that a speed of the user's network connection is below a threshold or determining that the user's network connection is metered;
in response to determining that the user's network connection is data-limited, providing the web page, wherein one or more content items on the web page having an original fidelity are replaced with low-fidelity versions of the content items, wherein the low-fidelity versions of the content items retain screen dimensions of the respective original-fidelity content items, and wherein providing the web page with the low-fidelity versions of the content items requires less data to be sent over the user's network connection than providing the web page with the original-fidelity content items;
including on the web page, for each low-fidelity version of a content item, a respective user-selectable option to display the original-fidelity content item;
determining that the user selected an option to display an original-fidelity content item in place of a low-fidelity version of a first content item;
in response to the selected option, retrieving the original-fidelity version of the first content item; and
providing the original-fidelity version of the first content item to replace the low-fidelity version of the first content item in the web page.

15. The media of claim 14, comprising:
in response to determining that the user's network connection is not data-limited, then providing the web page with the original-fidelity content items.

16. The media of claim 14, comprising:
prior to providing the web page, determining that one or more content items on the web page are associated with one or more interests of the user; and
automatically including on the web page, for one or more of the content items associated with the one or more interests of the user, the original-fidelity content item rather than a low-fidelity version of the content item.

17. The media of claim 14, wherein the web page with the low-fidelity versions of the content items maintains an original layout of the web page.

18. A system for providing a web page over a data-limited connection, comprising:
one or more processors;
one or more computer storage media having embodied thereon computer-executable instructions which, when executed by the one or more processors, perform operations comprising:
in response to a request from a user to display a web page via a network connection, determine whether the user's network connection is data-limited, wherein determining that the user's network connection is data-limited comprises determining that a speed of the user's network connection is below a threshold or determining that the user's network connection is metered;
in response to determining that the user's network connection is data-limited, provide the web page, wherein images on the web page having an original fidelity are replaced with low-fidelity versions of the images, and wherein providing the web page with the low-fidelity versions of the images requires less data to be sent over the user's network connection than providing the web page with the original-fidelity images; and
include on the web page, for each low-fidelity version of an image, a respective user-selectable option to display the original-fidelity image.

19. The method of claim 18, wherein the web page with the low-fidelity versions of the images maintains an original layout of the web page.

20. The method of claim 18, wherein the low-fidelity versions of the images retain screen dimensions of the respective original-fidelity images.

* * * * *